June 2, 1970 G. V. JACOBY 3,516,066

READBACK CIRCUIT FOR INFORMATION STORAGE

Filed March 15, 1968 2 Sheets-Sheet 1

INVENTOR
GEORGE V. JACOBY

BY John T. O'Halloran
ATTORNEY

INVENTOR
GEORGE V. JACOBY
BY John T. O'Halloran
ATTORNEY

United States Patent Office 3,516,066

Patented June 2, 1970

3,516,066

READBACK CIRCUIT FOR INFORMATION STORAGE SYSTEMS

George V. Jacoby, Bala-Cynwyd, Pa., assignor to RCA Corporation, a corporation of Delaware Filed Mar. 15, 1968, Ser. No. 713,387
Int. Cl. G11b *5/00, 5/44;* H04b *15/04*
U.S. Cl. 340—174.1 8 Claims

ABSTRACT OF THE DISCLOSURE

A readback circuit is provided which employs phase and amplitude compensation to reduce distortion in a readback signal. The readback circuit also processes the readback signal to simulate the waveshape of the initial recording signal to permit the extraction of accurate data therefrom.

CROSS REFERENCE TO RELATED APPLICATION

Reference is made to a copending application entitled "Readback Systems for Information Storage Systems," Ser. No. 436,764, now Pat. No. 3,405,403, filed Mar. 3, 1965 for George V. Jacoby and Joseph D. Gleitman and assigned to the same assignee as the present invention.

BACKGROUND OF THE INVENTION

To obtain high performance from polarizable storage systems, such as magnetic tape stations or discs, dielectric recording mediums, and the like, a large amount of digital data is densely packed on the recording medium. The high packing densities are obtained by utilizing various types of recording codes, such as a non-return-to-zero recording code (NRZ), a Manchester type phase-modulation recording code, a double frequency recording code, a delay modulation code, or the like. A common feature of such recording codes is that a transition in polarization in the polarizable storage medium conveys the significant information. Since a transition in polarization produces a pulse in the readback signal, the peaks of the readback signals may be utilized to extract the data information from the readback signal.

One difficulty encountered in extracting data information is that the readback signals contain phase distortions that are a result of the inherent limitations of both the recording and reading processes in such storage systems. These phase distortions introduce timing errors into the data information and hence cause incorrect readings as the data packing density gets higher and higher.

A technique for extracting data information from a readback signal is described in the previously referenced copending patent application. In this technique, the readback signal is processed in a manner to provide an effective simulation of the original recording signal. The closer the original recording signal is simulated by the processed readback signal, the more accurate is the timing of the data information. However, it has been discovered that the simulated readback signal derived when employing the above technique exhibits a high frequency transient "ringing" due to the sharp cut-off nature of the system.

OBJECT

It is an object of this invention to provide an improved readback circuit that reduces distortions in a readback signal and provides an effective simulation of the initial recording signal, so that an accurate data signal can be extracted therefrom.

SUMMARY OF THE INVENTION

A recording system embodying the invention includes a transducer coupled to read a storage medium for providing a readback signal that includes a plurality of signal components of different frequencies. Amplitude and phase compensator circuits are provided to boost the amplitude of said readback signal up to a desired cut-off frequency to provide a substantially linear amplitude response for the system up to the cut-off frequency and to restore symmetry in the readback signal waveshape. A delay circuit is coupled to delay the readback signal for a time delay substantially corresponding to the period of said cut-off frequency. Subtracting means are included in the readback circuit to subtract the delayed from the undelayed readback signal to provide a corrected readback signal that is quadrantally shifted in phase with respect to the undelayed readback signal.

GENERAL DESCRIPTION

Figure 1:
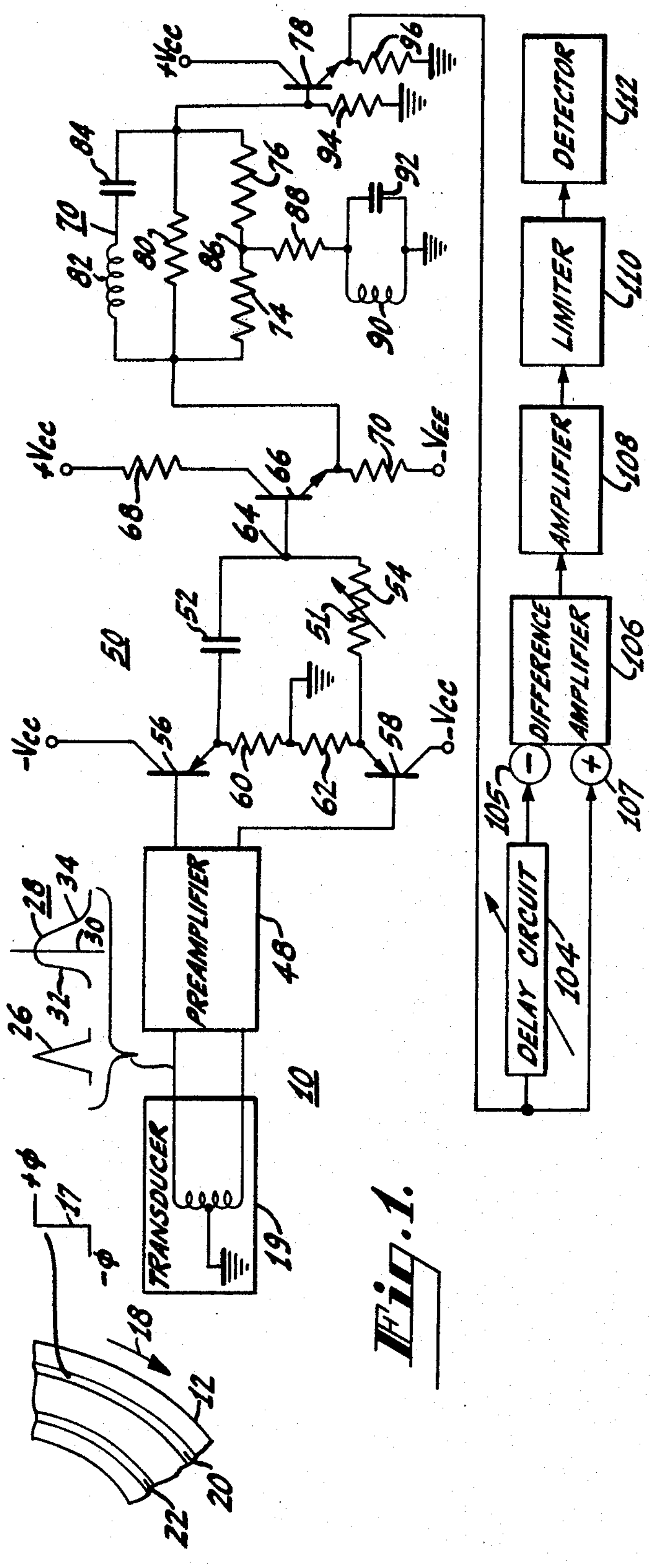
FIG. 1 is a schematic block diagram of a recording system embodying the invention.

FIG. 1 shows a recording system that includes a readback circuit 10 that processes a readback signal derived from a polarizable storage medium 12. The polarizable storage medium 12 may, for example, comprise a magnetic, a dielectric, or other storage medium and may consist of a tape, a disc, a drum, or the like. For the purpose of this specification, it will be assumed that the polarizable storage medium 12 is a disc that is coated with magetic material. It is also assumed that data, in binary form is stored on the storage medium 12 and is recorded thereon by a Manchester type phase-modulated recording signal 13, such as that shown in line *a* of FIG. 2.

Figure 2:
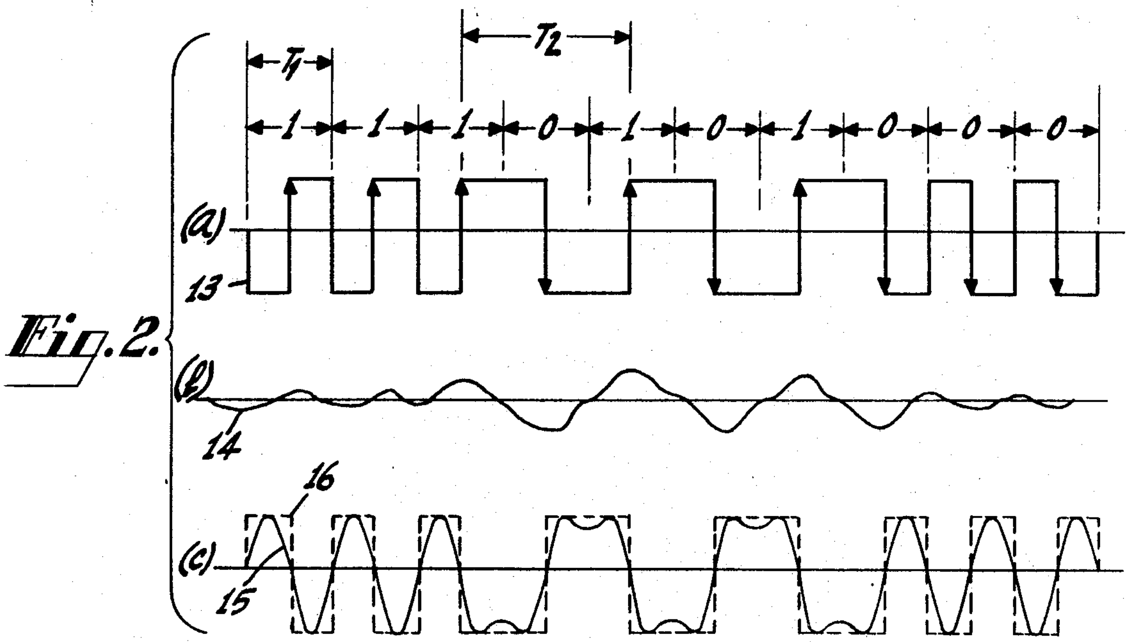
FIG. 2 shows a group of waveforms, somewhat idealized, that occur at various points in the recording system of FIG. 1.

In this type of recording, a rectangular recording signal current of two signal levels of opposite polarity are used to record each binary digit (bit). A binary "1" may, for example, be recorded by applying a first recording signal of one polarity, such as negative, to polarize the storage medium 12 in one direction and then a second recording signal of the opposite polarity, such as positive, to polarize the medium 12 in the opposite direction. A binary "0" is recorded by applying the second recording signal to polarize the medium 12 in the said opposite direction and the first recording signal to polarize the medium in the said one direction. With this type of recording, each bit cell in the medium 12 is polarized in two opposite directions with a transition in polarization occurring in the approximate center of the bit cell. Such a transition in magnetic flux $\phi$ is shown by the step waveform 17 in FIG. 1 (upper left). A bit cell in which the bit "1" is recorded may, for example, exhibit a negative to a positive transition in polarization. Such a transition is represented in FIG. 2 by an arrowhead pointing to the top of the figure. A bit cell in which the bit "0" is recorded exhibits a positive to a negative transition in polarization. Such a transition is represented by an arrowhead pointed to the bottom of FIG. 2. Thus the recording signal 13 illustrates the binary number sequence 1110101000.

In the recording signal 13, a succession of binary "1's" or "0's" exhibit a period $T_1$ which is one-half the period $T_2$ exhibited by a series of 0 to 1 or 1 to 0 transitions. This is because a succession of "1's" or "0's" requires that the signal 13 return to the same point to record an identical bit, whereas the 0 to 1 and 1 to 0 transitions do not. Thus the recording signal 13 is essentially a two period or two frequency squarewave signal. The fundamental frequency of the squarewave of the period $T_1$ is designated $f_0$ and the fundamental frequency of the squarewave of the period $T_2$ is one-half that of $f_0$ or $f_0/2$. Information is read out of the medium 12 at the frequency rate $f_0$.

In read out, the relative motion between the magnetized disc 12, which is rotated in the direction of the arrow 18 in FIG. 1, and a magnetic transducer or readhead 19 induces a readback voltage in the transducer 19. At high packing density, the readback signal may be similar to the signal 14 in line *b* of FIG. 2. The readback signal 14 is both amplitude and phase distorted and the peaks of this waveform are not sufficiently sharp or distinct enough to generate accurate timing pulses therefrom. The readback signal 14 may, for example, be derived from an outer circumferential data track 20 on the disc 12. An inner circumferential track 22 would exhibit an even more distorted readback signal, due to the approximately 50% greater packing density therein.

Figure 3:
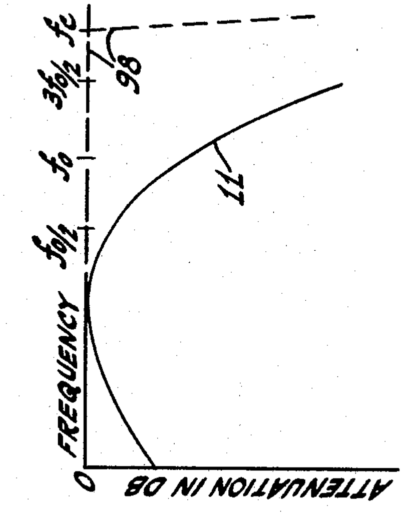
FIG. 3 is a graph illustrating the frequency response of the recording system of FIG. 1.

Amplitude distortions in the waveform 14 occur at high packing density because the finite size of the transducer 19 causes it to intercept flux patterns from adjacent bit cells. These flux patterns interact to such an extent that partial cancellation occurs at the higher frequency $f_0$. The attenuation versus frequency response of the recording system, including the transducer 19, is shown by the curve 11 in FIG. 3. It is to be noted from this curve 11 that in the frequency range of interest the higher frequencies in the readback signal are attenuated more than the lower frequencies. For example, the portion of the readback signal 14 that is derived from the relatively high frequency component $f_0$ in the recorded signal 13 exhibits a much smaller amplitude than that portion derived from the lower frequency component $f_0/2$.

Phase distortion in the readback signal occurs because of the impossibility of providing a perfect mechanical and electrical system. During readback, readback pulses are produced in response to the magnetic flux transitions similar to the step 17. In a perfect system, the magnetic transducer head 19 comprises an ideal differentiator that produces a spike pulse for each transition 17, such as shown by the pulse 26 in FIG. 1. However, in a practical system, the imperfections which are present in the system cause a pulse to be produced which is similar to the pulse 28 in FIG. 1. This pulse 28 is much wider than the spike pulse 26 and is not symmetrical about the center point 30. The leading edge 32 of the pulse 26 is much steeper than its trailing edge 34. The asymmetry of the readback pulse 28 is the result of phase distortion in the readback process. Such asymmetry creates difficulties when data is packed densely because the readback signal pulse peaks are displaced and inaccurate timing can result. The timing error is particularly serious at points in the readback signal waveshape where the frequency changes.

A quadrantal or 90° phase shift also occurs in each signal component of the readback signal. Such a quadrantal phase shift is due to the inherent differentiation that occurs in the transducer 19 during readback.

A readback circuit embodying the invention converts the readback signal 14 (FIG. 2) into signal 15 which is a substantial simulation of the initial recording signal 13. The peaks of the signal 14 correspond to the zero crossovers of the signal 15 and these reliable zero crossovers are utilized to generate an accurate timing signal. To derive an acceptable simulated signal 15 from the distorted readback signal 14 at high packing densities, it is necessary that the readback signal 14 be phase and amplitude compensated as well as quadrantally shifted in phase.

Figure 4:
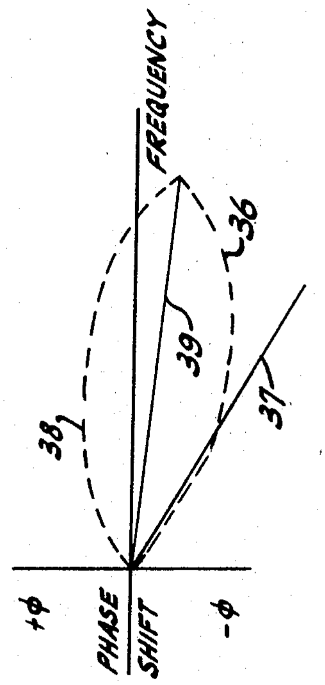
FIG. 4 is a graph illustrating the phase compensation needed to remove phase distortion from a readback signal derived from the recording system of FIG. 1.

To provide phase compensation for the readback pulses 28 (FIG. 1), it is necessary that the nonlinear phase shift characteristic 36 (FIG. 4) of the entire recording system including the storage medium 12, the transducer 19, and the readback circuit 10 be changed into a linear characteristic such as the ideal straight line characteristic 37 of FIG. 4. A compensating phase shift characteristic curve 38, which is a mirror image of the distortion characteristic 36, is therefore introduced into the recording system to provide a phase shift of an opposite sense to that of the characteristic 36. Both characteristics combine to provide an overall linear phase characteristic 39. Readback pulses 28 derived from a system exhibiting the linear phase characteristic 39 are symmetrical about the center point 30. The linear phase characteristic 39 differs from the characteristic 37 only in introducing a different delay into the readback signal. The means for introducing the phase compensation will be described subsequently.

To provide amplitude compensation in the readback signal 14, it is necessary that the signal 14 be amplitude boosted in the correct manner. To accomplish this, use is made of the fact that a squarewave signal may be considered to comprise a sinewave of a fundamental frequency as well as additional sinewaves of odd harmonics of the fundamental. A frequency analysis of the distorted readback signal 14 discloses that it contains a severely attenuated sinewave of frequency $f_0$. This portion of the readback signal 14 corresponds to the squarewave signal of the period $T_1$ that occurs due to the series of binary "1's" or "0's" in the recording signal 13. Similarly, the signal 14 also contains a slightly attenuated sinewave of frequency $f_0/2$ as well as a heavily attenuated third harmonic signal $3f_0/2$. To provide an acceptable replica of the recording signal 13 for timing purposes, it is not necessary to duplicate all of the frequencies that are contained in the original squarewave recording signal. As will be described in more detail subsequently, boosting the readback signal so as to provide a substantially flat attenuation response up to a cut-off frequency $f_c$, provides the required amplitude compensation.

Figure 5:
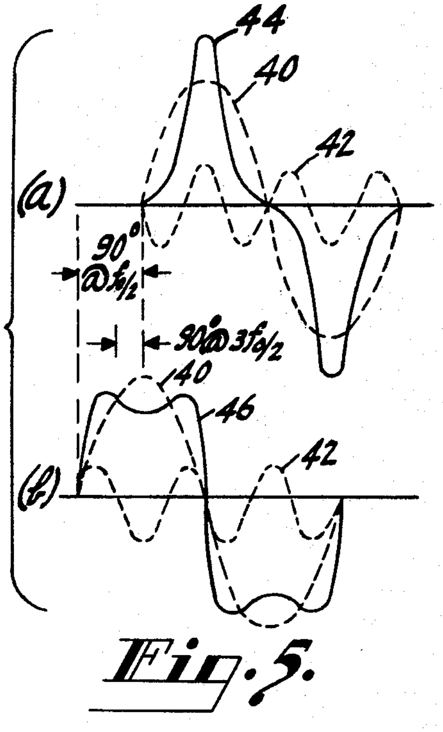
FIG. 5 comprising FIGS. *5a* and *5b* are graphs illustrating the inherent phase shift produced by the transducer in the recording system of FIG. 1 and the correction thereof.

The phase and amplitude compensated readback signal is further processed into a simulated recording signal 15 by quadrantally shifting the phase thereof. To illustrate the significance of the quadrantal phase shifting aspect of the signal 14, reference is made to FIG. 5. FIG. 5*a* shows a fundamental sinewave 40 of frequency $f_0/2$ and a third harmonic wave 42 of frequency $3f_0/2$ and ⅓ the amplitude of wave 40. The sum of the two waves is the resultant wave 44 which, it is to be noted, resembles the portions of the readback signal 14 in line *b* of FIG. 2 that are derived from the period $T_2$ in the initial recording signal 13. FIG. 5*b* shows the relationship of the two waves 40 and 42 when they are both phase shifted by 90°. A 90° or quadrantal phase shift of the fundamental wave 40 results in a greater displacement than a quadrantal phase shift of the third harmonic 42. The result of such a quadrantal phase shift is that both the fundamental 40 and third harmonic 42 waves add up to the resultant wave 46. The resultant wave 46 is a substantial reproduction of a squarewave when only the fundamental and third harmonic components are present in the squarewave and the third harmonic amplitude is one third the amplitude of the fundamental. In order to provide such a substantial replica of the input waveform, both the high and the low frequency components of the uncorrected readback waveform 14 must be amplitude boosted and a quadrantal phase shift introduced into the readback waveform. Such a quadrantal phase shift is readily provided by a differentiation process, as will be described in more detail subsequently.

DETAILED DESCRIPTION

When the magnetic disc 12 is rotated in the direction of the arrow 18 in FIG. 1 and the transducer 19 is positioned adjaecnt thereto, the relative motion therebetween causes the transitions in polarization on, for example, the outer recording track 20 to produce pulses corresponding to the transitions. The pulses for the transition 17 are similar to the pulse 28 in FIG. 1. For an opposite transition, the pulses are opposite in polarity to the pulse 28. Both polarity pulses however exhibit phase distortion. If the recording signal is, for example, an NRZ signal, the pulses 28 may be spaced apart from each other, but for a phase modulated recording signal such as 13 in FIG. 2 the pulses 28 of opposite polarities merge into a continuous readback signal such as the signal 14 in line *b* of FIG. 2. With either type of recording signal, the readback circuit 10 can compensate for phase and amplitude distortion.

The readback signal derived from the transducer 19 is amplified in a linear preamplifier 48 and then applied to a phase compensator circuit 50. The phase compensator circuit 50 includes two push pull transistors 56 and 58 and a phase shifting circuit 51 comprising the combination of a variable resistor 54 and a reactance, such as a capacitor 52. The double ended readback signal from the preamplifier 48 is applied through the pair of push pull transistors 56 and 58, which are connected as emitter followers to provide a low source impedance to the R-C phase shifting circuit 51. The phase shifting circuit 51 may also be an R-L (resistance inductance) phase shifter. Each transistor 56 and 58 includes an input base electrode for receiving the output signal from the preamplifier 48, and a collector electrode coupled to a power supply $-V_{CC}$.

The emitters of the transistors 56 and 58 are coupled through resistors 60 and 62 to a point of reference potential such as ground. The capacitor 52 and resistor 54 are coupled between the respective emitters of the transistors 56 and 58. The junction 64 of the capacitor 52 and resistor 54 is coupled to the base electrode of a transistor 66. The transistor 66 includes a collector electrode coupled through a resistor 68 to a power supply $+V_{CC}$, and an emitter electrode coupled through a resistor 70 to a power supply $-V_{EE}$. The transistor 66 is connected as an emitter follower to provide a high load impedance to the phase compensator 50 as well as a low source impedance to an amplitude compensator 70 connected thereto.

The phase compensator 50 in combination with the amplitude compensator 70 compensates for the phase distortion in the recording system. Although the main function of the phase compensator 50 is to shift the phase of the readback signal in a desired manner, the amplitude compensator 70 also introduces a phase shift. Accordingly, the variable resistor 54 is adjusted so that the combination of the phase compensator 50 and the amplitude compensator 70 exhibits the phase shift characteristic 38 as shown in FIG. 4. It is to be noted, the phase shift characteristic 38 of the combined phase compensator 50 and amplitude compensator 70 is substantially equal and opposite to the phase distortion characteristic 36 of the recording system. The introduction of this opposite phase shift produces an overall linear phase characteristic 39 for the recording system. The result of such a phase shift is to provide readback pulses that are symmetrical about center points 30.

After phase compensation in the circuit 50, the readback signal is amplitude-compensated in an amplitude booster network 70. The boost network 70 comprises a bridged T network including a pair of resistors 74 and 76 that are serially-connected from the emitter of the transistor 66 to the input base electrode of an output transistor 78. Shunted across the resistors 74 and 76 is a resistor 80 and shunted across the resistor 80 is the series combination of an inductor 82 and a capacitor 84 that is resonant at a frequency $f_r$. The junction 86 between the resistors 74 and 76 is connected through resistor 88 and a parallel circuit, comprising an inductor 90 and a capacitor 92, to ground. The inductor 90 and a capacitor 92 are also selected to be resonant at the frequency $f_r$. A resistor 94 is also coupled between the input base electrode of the transistor 78 and circuit ground. The collector electrode of this transistor 78 is coupled to the power supply $+V_{CC}$ and its emitter electrode is coupled through a resistor 96 to circuit ground.

The amplitude compensator 70 boosts the higher frequency components in the readback signal 14 which are the frequency components that are the most severely attenuated in an uncorrected readback circuit. The overall purpose of amplitude boosting is to provide an essentially linear or flat attenuation-frequency response curve for the frequencies of interest in the readback signal 14. Because the fundamental and odd harmonics occur in the right proportions in the original recording 13 signal, the altering of the recording system's frequency response from the curve 11 in FIG. 3 to a flat frequency response results in a reasonably good simulation of the amplitudes of the initial squarewave. The resonant frequency $f_r$ of the amplitude booster 70 is therefore selected to be a frequency slightly above the frequency $3f_0/2$ of the third harmonic component. This resonant frequency $f_r$ effectively establishes a sharp cut-off frequency $f_c$ for the recording system above which the attenuation increases sharply.

One difficulty encountered with the sharp cut-off in the boost network 70 is that transient ringing may occur. Thus is shown by the pulse 100 in FIG. 6 which has a transient ringing tail 102. The frequency of the transient ringing tail 102 is the resonant frequency of the amplitude compensator 70 which is essentially the same as the cut-off frequency $f_c$, shown in the response characteristic 98 of FIG. 3. The period of this transient ringing tail 102 is shown by D in FIG. 6.

Referring back to FIG. 1, the readback circuit 10 also includes delay circuit 104 which may be variable and which may consist of passive elements. The output of the transistor 78 is coupled to the delay circuit 104. The delay circuit 104 is adjusted to delay the phase and amplitude compensated readback signal for a time delay substantially equal to the period D of the ringing tail 102. The delayed readback signal from the delay circuit 104 is applied to a first input terminal 105 of a difference amplifier 106. A direct or undelayed readback signal from the transistor 78 is also applied to the other input terminal 107 of the difference amplifier 106. Since the difference amplifier 106 subtracts the delayed readback signal from the undelayed readback signal, the first input terminal 105 is labelled with a minus sign ⊖ and the second input terminal 107 is labelled with a plus sign ⊕. The delay circuit 104 and difference amplifier 106, as will be more fully described subsequently, quadrantally shifts the phase of the readback signals, provides an amplitude boost to the readback signal in addition to the amplitude compensator 70, and selectively filters out the transient ringing in the boosted readback signal.

To extract an accurate timing signal from the corrected readback signal (i.e. the phase and amplitude compensated and quadrantally phase shifted signal) the corrected readback signal is greatly amplified in an amplifier 108 coupled to the difference amplifier 106 and then limited in a limiter 110 to provide substantially a rectangular output signal. The near vertical slopes at the zero amplitude crossovers are then detected in a crossover detector 112 to provide a series of accurate data pulses.

OPERATION

The disc 12 is rotated and one of the recorded data tracks thereon is read by the transducer 19. Each transition in polarization causes a readback pulse that is phase distorted. When the transitions occur close to each other, the readback pulses comprise a continuous signal such as the readback signal 14 in FIG. 2. The readback signal is amplified in the linear preamplifier 48 and then applied to the push pull transistors 56 and 58 in the phase compensator circuit 50. The phase compensator circuit 50 in combination with the amplitude compensator 70 introduces the phase shift characteristic 38 to compensate for the phase distortion characteristic 36 to provide an overall linear phase characteristic 39 for the recording system. The individual pulses in the readback signal are therefore rendered symmetrical about their center points.

The phase compensated readback signal is then amplitude boosted up to a cut-off frequency $f_c$ which is slightly above the third harmonic frequency $3f_0/2$. The amplitude booster 70 provides the main amplitude boost in the readback circuit 10. However, the combination of the delay circuit 104 and the difference amplifier 106 also provides an additional amplitude boost. The recording system is effectively altered to exhibit the flat amplitude response characteristic curve 98 from a frequency lower than $f_0/2$ up to a cut-off frequency $f_c$ above the third harmonic $3f_0/2$. The flat response means that within the frequency range of interest, the various frequency components in the readback signal exhibit the same relative amplitudes as occurred in the initial recording signal 13 in FIG. 2. Thus as shown in FIG. 5*b*, the fundamental $f_0/2$ and third harmonic component $3f_0/2$ exhibit when amplitude boosted, the correct amplitudes that permit simulation of the initial recording signal squarewave when quadrantally phase shifted. Thus the response need not be flat above the cut-off frequency $f_c$. The attenuation-frequency response instead of being flat may be designed to exhibit a rising slope, i.e., provide over-compensation, if desired in certain instances.

After amplitude and phase compensation, the readback pulses resemble the signal 44 in FIG. 5*a*. To convert such a signal 44 into the double-humped signal 46 in FIG. 5*b*, a quadrantal phase shift is needed. Additionally, the readback signals exhibit a transient ringing tail 102, FIG. 6, introduced by the sharp cut-off characteristic of the amplitude compensator 70. The bridge T network is selected to exhibit a resonant frequency sufficiently above the third harmonic frequency $3f_0/2$ so that the means selected to suppress the ringing tail 102 do not interfere with the third harmonic.

The combination of the delay circuit 104 and the difference amplifier 106 performs the functions of selective filtering by suppressing the ringing tail 102, quadrantally shifting the phase of the readback signal and providing an amplitude boost. The combination of a time delay and subtraction means is effectively a differentiator which performs a quadrantal phase shift and provides an approximate six decibels per octave amplitude boost. Additionally, selective filtering is also provided therein.

Figure 6:
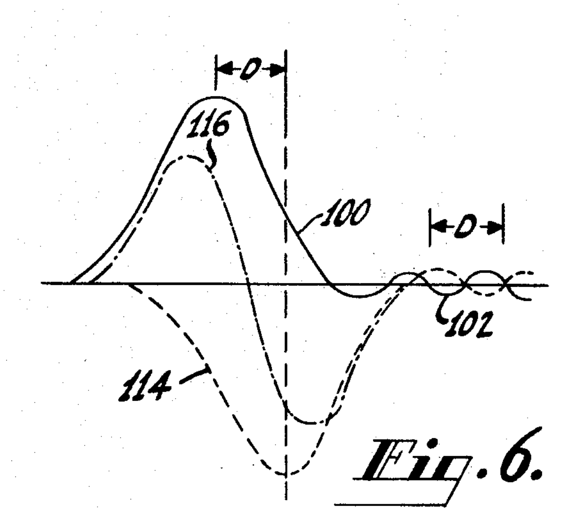
FIG. 6 is a graph illustrating the compensation for the transient ringing that occurs in an amplitude boosted readback signal derived in the readback circuit of the recording system of FIG. 1.

Referring to FIG. 6, a delayed and inverted readback pulse 114 is shown in dotted form. The pulse is delayed by a time delay D equal to the period of the ringing tail 102 on this delayed readback pulse 114. The delay circuit 104 provides the time delay D. The difference amplifier 106 subtracts (i.e., inverts and adds) the delayed readback signal 114 from the undelayed readback signal 100. Due to the delay D, the ringing tails 102 of the delayed and undelayed signals are approximately 180° out of phase with each other and effectively cancel. The major portions of the pulses 100 and 114 therefore produce the resultant corrected signal 116 which exhibits no ringing tail. The corrected signal 116 is also shifted quadrantally as is desired.

Figure 7:
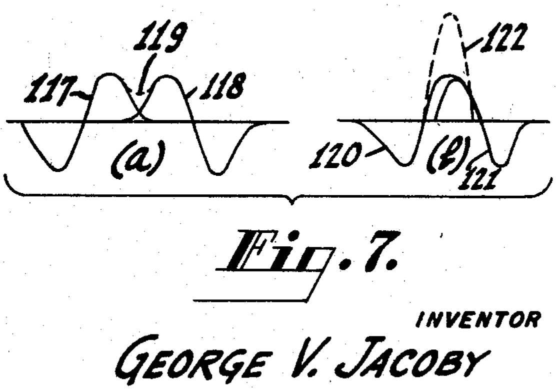
FIG. 7 comprising FIGS. *7a* and *7b* are graphs illustrating the resultant signals when the transient ringing is removed from the readback signals.

As shown in FIG. 7*a*, two corrected pulses 117 and 118 produce the desired double-humped pulse 119 of half-period $T_2/2$, substantially identical to the pulse 46 in FIG. 5*b*. The pulse 117 may, for example, be derived from one transition step 17 and the pulse 118 from an opposite transition step at a pattern change from a binary 1 to a binary 0 or vice versa. As shown in FIG. 7*b*, two corrected pulses 120 and 121 produce an enlarged pulse 122 of half-period $T_1/2$. The pulses 120 and 121 are derived from transitions in a series of binary "1's" or "0's." The fact that these higher frequency pulses 122 are over-compensated in amplitude causes no difficulty in extracting timing pulses from the zero amplitude crossovers thereof. The amplitude of the pulses 122 is a decided advantage when the inner circumferential tracks such as the track 22 on the disc 12 are being read. This is because these higher frequency signals are so severely attenuated at very high packing densities that the added amplitude is an asset in accurate reading. Thus the combination of the delay circuit 104 and the difference amplifier 106 not only provides the desired quadrantal phase shift for the readback signal, but also selectively filters out the ringing tail 102. Timing errors caused by the ringing tail 102 are therefore substantially eliminated. The compensated readback signal 15 of FIG. 2 is therefore obtained at the output of the difference amplifier 106 and it is then further processed to extract accurate data therefrom.

Thus, a readback circuit is provided that permits very high density recording on a storage medium, with the added advantage of providing means for simply and inexpensively extracting accurate data information from the readback signal derived from the storage medium.

What is claimed is:

1. In a readback circuit for reading back from a polarizable storage medium informational data recorded thereon the combination comprising;

transducer means coupled to read said polarizable storage medium for providing a direct readback signal having a plurality of components of different frequencies, an amplitude compensator circuit for boosting the amplitude of said components of said direct readback signal up to a desired cut-off frequency so as to provide a substantially linear amplitude response for said readback circuit up to said cut-off frequency, a delay circuit coupled to delay said readback signal for a time delay substantially corresponding to the period of said cut-off frequency, and subtracting means coupled to subtract said delayed readback signal from an undelayed readback signal to provide a corrected readback signal that is quadrantally shifted in phase with respect to said direct readback signal.

2. The combination in accordance with claim 1 wherein said subtracting means comprises a difference amplifier having first input terminals for receiving said direct readback signals and second input terminals for receiving said delayed readback signals to produce a difference signal therefrom.

3. The combination in accordance with claim 2 wherein delay circuit and said difference amplifier effectively differentiate said direct readback signal to provide a corrected readback signal that is quadrantally shifted in phase with respect to said direct readback signal.

4. The combination in accordance with claim 2 wherein said amplitude booster means comprises a bridge T network having a resonant frequency substantially equal to said cut-off frequency.

5. The combination in accordance with claim 4 wherein said readback signal exhibits an undesired phase shift and said combination further includes a phase shifting circuit coupled to shift the phase of said direct readback signal in a sense opposite to said undesired phase shift.

6. The combination in accordance with claim 5 wherein said phase shift circuit comprises the combination of a reactance and a resistor.

7. The combination in accordance with claim 6 wherein said reactance comprises a capacitor.

8. In a readback circuit exhibiting a readback signal including a transient ringing tail of a known frequency, the combination comprising;

a delay circuit coupled to delay said readback signal for a time delay substantially corresponding to the period of said known frequency, and a difference amplifier coupled to subtract said delayed readback signal from an undelayed readback signal to cancel said transient ringing and to introduce a quadrantal phase shift into said readback signal.

References Cited

UNITED STATES PATENTS

| | | | |
|---|---|---|---|
| 2,450,352 | 9/1948 | Piety | 179—100.2 |
| 2,807,797 | 9/1957 | Shoemaker | 179—100.2 |

JAMES W. MOFFITT, Primary Examiner

W. F. WHITE, Assistant Examiner

U.S. Cl. X.R.

328—162